May 21, 1929.  E. J. CARROLL  1,714,125
CONTROLLING SYSTEM FOR AIR CONDITIONING APPARATUS
Filed June 14, 1922  2 Sheets-Sheet 1
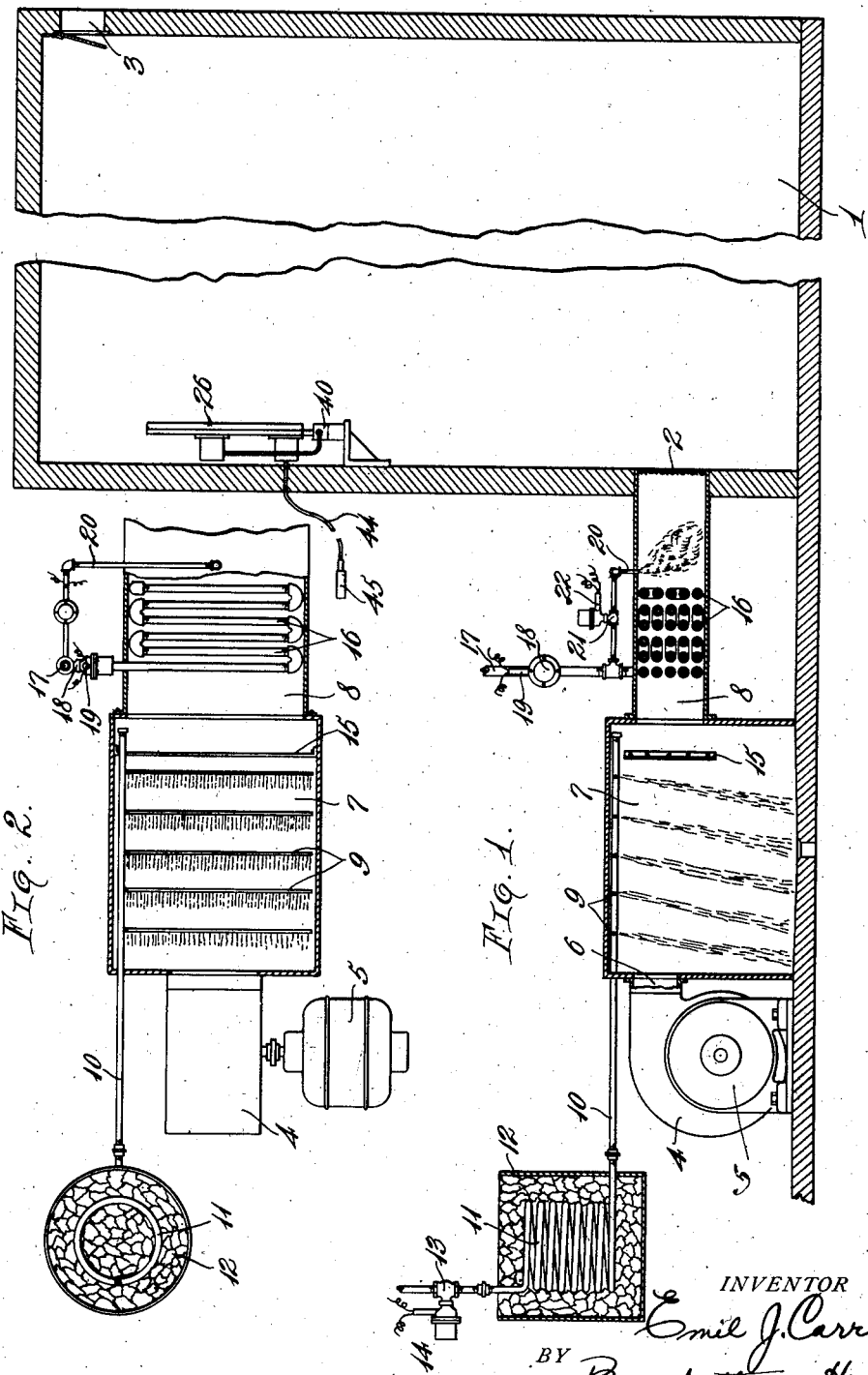
INVENTOR
Emil J. Carroll
BY Brockett and Hyde
ATTORNEY.

May 21, 1929.  E. J. CARROLL  1,714,125
CONTROLLING SYSTEM FOR AIR CONDITIONING APPARATUS
Filed June 14, 1922  2 Sheets-Sheet 2
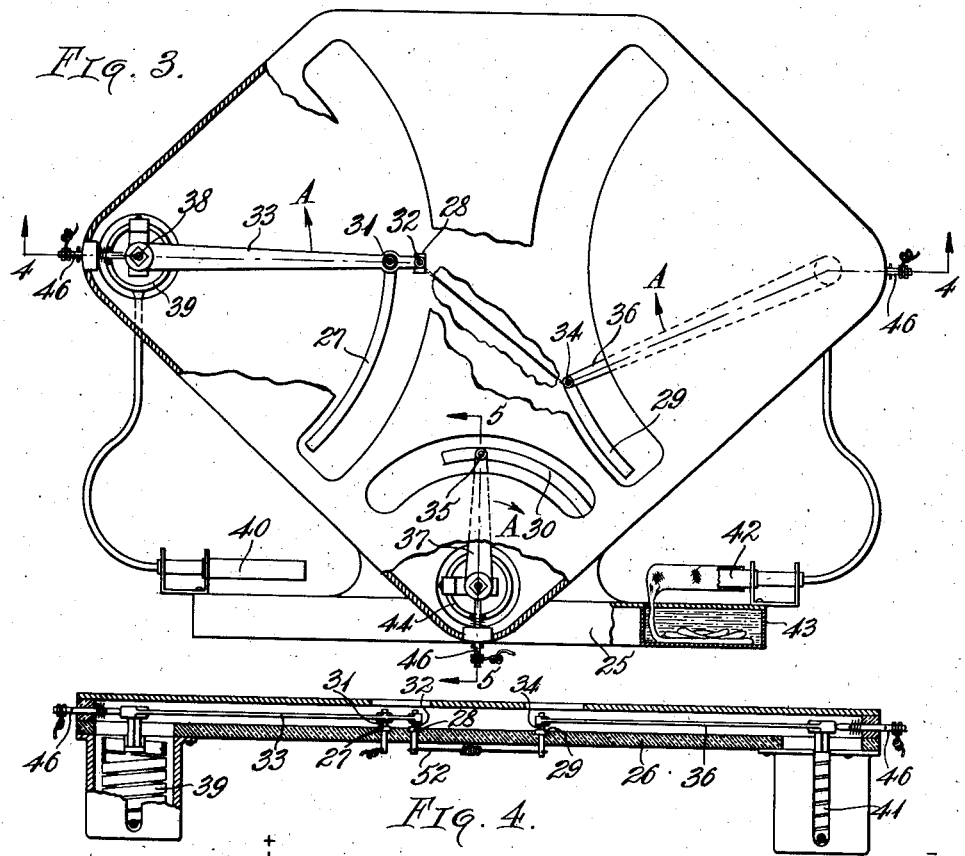
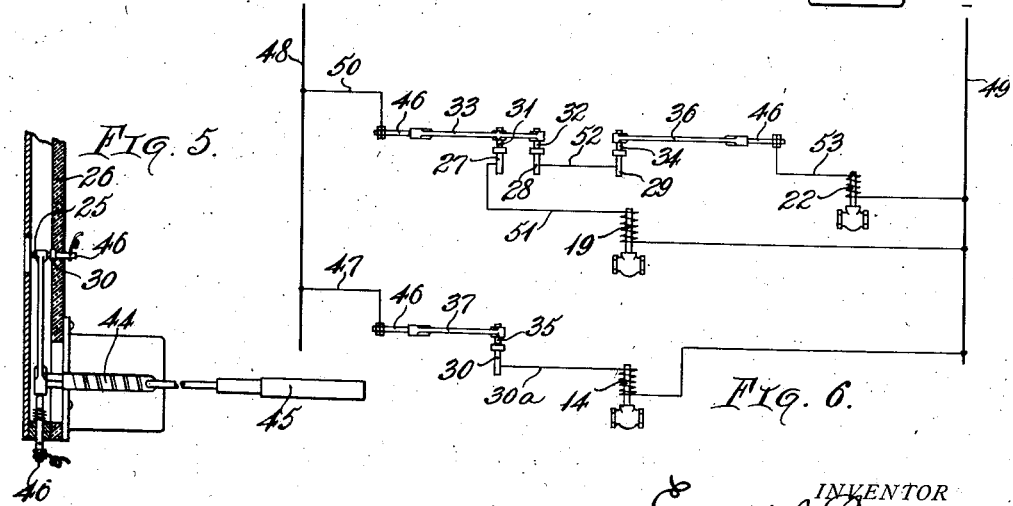
INVENTOR
Emil J. Carroll
BY Brockett and Hyde
ATTORNEY.

Patented May 21, 1929.

1,714,125

UNITED STATES PATENT OFFICE.

EMIL J. CARROLL, OF CINCINNATI, OHIO, ASSIGNOR TO THE AMERICAN LAUNDRY MACHINERY COMPANY, OF CINCINNATI, OHIO, A CORPORATION OF OHIO.

CONTROLLING SYSTEM FOR AIR-CONDITIONING APPARATUS.

Application filed June 14, 1922. Serial No. 568,258.

This invention relates to a controlling system for air conditioning apparatus.

The object of the invention is to provide an improved system and mechanism for properly conditioning the air supplied to any chamber, such as a room, a machine or apparatus, or to any other place, the controlling system being of such nature as to automatically maintain the air in said chamber at any desired temperature and to also automatically regulate the relative humidity therein by confining it within such reasonable limits as are desired.

Other objects of the invention are to simplify and improve the automatic control means for governing valves or other devices which regulate the temperature and humidity, and to provide control means which is relatively sensitive to slight changes in temperature and humidity and is capable of actuation or control by psychrometric apparatus.

Other objects of the invention are in part obvious and in part will appear more in detail hereinafter.

The invention comprises the construction and arrangement of parts hereinafter described and claimed.

In the drawings, which represent one suitable embodiment of the invention, Fig. 1 is a longitudinal section illustrating a room for which the air supply is to be conditioned and also the air conditioning apparatus therefor; Fig. 2 is a plan view of the air conditioning apparatus, parts being broken away and in section to show interior portions of the mechanism; Fig. 3 is a front view, partly broken away and in section, of the psychrometric controlling instrument; and Fig. 4 is an inverted sectional plan view on the line 4—4, Fig. 3; Fig. 5 is a detail section on the line 5—5, Fig. 3; and Fig. 6 is a diagrammatic view, showing the electric control circuits and devices related thereto.

Referring to the drawings 1 conventionally indicates any room or chamber to be supplied with properly conditioned air. This may be a room or chamber of a dwelling or building or a chamber or cavity of some machine or apparatus used for drying or moistening purposes. Properly conditioned air is supplied to said chamber through a screened inlet 2, the chamber being also provided with a suitable outlet or vent 3, as will be readily understood. 4 represents a suitable fan or blower driven by a motor 5, and drawing its air from the outside atmosphere and forcing it into the room or chamber through a chamber 7 connected by a conduit 8 to the room inlet 2. In said chamber 7 are a series of spray pipes 9 to which water or some cooling or condensing agent is supplied by a pipe 10, the water in said pipe being cooled by passing the same through the coil 11 of a suitable cooler 12. The flow of water through this cooler is controlled by a suitable valve 13 actuated by a solenoid 14. In the chamber 7 is also located a baffle 15 at the entrance to the conduit 8 and preventing water or moisture from being directly carried by the air current into said conduit. In the conduit 8 are located a series of heating coils 16 through which steam is circulated from a steam supply pipe 17 having a controlling valve 18 actuated by a solenoid 19. The steam circulated through said pipes is exhausted to the atmosphere or to any suitable point, but live steam for moistening purposes may also be supplied to the conduit 8 through a pipe 20, the flow of said steam being controlled by a valve 21 actuated by a solenoid 22. As shown pipe 20 is connected to the same supply pipe 17 which supplies the heating steam, so that valve 18 controls both the heating and moistening steam supplies, but if desired, the steam from pipe 20 may come from a separate source independent of control by valve 18, as will be readily understood. While, as will hereafter appear, the apparatus may be arranged to maintain any desired temperature and percentage of relative humidity in chamber 1, the apparatus has been illustrated as arranged to maintain a temperature of 70° F., and a maximum of 40 per cent relative humidity. The air supply from blower 4 enters chamber 7 where it flows past the streams of cooled water coming from the jet openings in pipes 9. Assuming that the air contains excess moisture, the cold water cools the air to a relatively low temperature, say 40° or so, which condenses a part of the moisture originally in the air so that the air leaves said chamber chilled with little or no moisture in it, even though it was originally saturated. The air is then heated by the heating coil 16 and moisture is supplied to it, if necessary, from the steam pipe 20.

Saturated air at 43° temperature contains just the proper quantity of moisture so that when said air is heated to 70° the relative humidity at normal barometric pressures will be 40 per cent. Consequently if the temperature of the outside air drops to or below 43°, it is unnecessary to operate the cooler 12 or subject the air to a condensing water spray, but satisfactory results are obtained by merely heating the air to 70° and increasing its moisture content if desired. The control apparatus therefore includes means for automatically actuating valve 13 to stop the flow of dehumidifying cooling or condensing water when the outside temperature drops to or below 43°.

To maintain the temperature in the room or chamber 1 at a maximum of 70° the controlling apparatus is also sensitive to the temperature within said room or chamber so that the incoming air if cool is heated to said temperature and the heating appliance is cut out of operation if the temperature within the room rises to or above 70°.

Again, to maintain the relative humidity so as not to exceed 40 per cent the control devices respond to variations in the relative humidity of the air in chamber 1 so as to automatically regulate the quantity of moisture supplied to the incoming air by the pipe 20.

The controlling device for producing the foregoing effects is a special form of psychrometer similar in many respects to the psychrometer forming the subject matter of the copending application of myself and George W. Johnson, Serial No. 568,240, filed June 14, 1922, to which reference may be had for a more complete description if desired. The present psychrometer embodies only such features of the psychrometer of the aforesaid copending application as are necessary to effect the results here required.

Referring now to Figs. 3 to 6, inclusive, the controlling psychrometer comprises a suitable base 25 carrying a frame 26 of insulating material in which are mounted conducting segments 27, 28, 29 and 30, the first two of which cooperate with contacts 31, 32 on a switch arm 33, while segments 29 and 30 respectively cooperate with contacts 34, 35 on switch arms 36, 37, respectively. Switch arm 33 is pivotally mounted to turn about the axis 38, its motion being produced by a Bourdon tube 39 connected to a dry bulb thermometer 40. Since the controlling instrument shown in Fig. 3 is mounted within the room 1, thermometer 40 is sensitive to the temperature in the room 1 and the switch arm 33 always stands at a position corresponding to such temperature. Switch arm 36 is similarly mounted and is controlled by a Bourdon tube 41 connected to a wet bulb thermometer 42, the wick for which dips into a reservoir of liquid 43. This wet bulb thermometer is also within the room or chamber and consequently the switch arm 36 always stands at a position indicating the evaporation point in said room or chamber. Switch arm 37 is similarly mounted and is controlled by a Bourdon tube 44 connected to an ordinary dry bulb thermometer 45 which, as shown in Fig. 1, is outside of the chamber 1 and is consequently sensitive to the temperature of the outside atmosphere. The particular manner of mounting the Bourdon tubes and connecting the same to actuate the several switch arms is immaterial, but in the form shown is of the same character as the same parts shown in the prior application before referred to.

With each of the switch arms 33, 36 and 37 cooperates a yielding brush 46 and to said brushes are connected the lead wires for the electric circuits. In each case with an increase in temperature, the several switch arms 33, 36 and 37 move in the direction of the several arrows A applied thereto.

Since the present instrument is assumed to maintain a maximum of 70° temperature within the chamber 1, segment 27 is of such length that its upper end (Fig. 3) terminates at a position corresponding to 70° normal temperature. The segment 28 lies directly opposite the upper end of segment 27 and is of short circumferential extent, say only a few degrees. Segment 29, for reasons which will be explained, terminates at its opposite ends at temperatures of approximately 54½ degrees and 56 degrees. The several segments are connected in circuits as shown in Fig. 6. One circuit extends by a wire 47 from the positive lead wire 48 through a brush 46 to the switch arm 37, thence to segment 30 and by wire 30ª through the coil of the solenoid 14 and thence to the negative wire 49. Another circuit extends from the positive lead wire 48 by a wire 50 and brush 46 to the switch arm 33 where the circuit divides. One of the following branch circuits is through the contact 31 and segment 27 and by wire 51 through the coil of the solenoid 19 to negative. The other branch circuit is through the contact 32 to segment 28, which is connected by a cross wire 52 to segment 29 from which the current flows to contact 34, switch arm 36, brush 46 and by wire 53 through the solenoid 22 to negative.

The operation is as follows: Switch arm 37 controls the operation of the cooler 11, 12. This switch arm cooperates with a segment which is of such circumferential extent as to cause the circuit through solenoid 14 to be completed at all times except only when the switch arm moves to the extreme left in Fig. 3 and passes off from the end of the segment 30 which represents a normal outside temperature of 43°. Consequently whenever the outside temperature is above 43° solenoid 14 will be energized, valve 13 will be opened and cooling or condensing water will be delivered to chamber 7. If the outside temperature falls below 43° the circuit including switch arm 37 is opened, solenoid 14 is deenergized and valve 13 closes. By adjusting or initially calibrating the location of the left hand end of segment 30 the instrument may be made to turn on and off the supply of cooling water at any other temperature than 43°, as will be readily understood.

Now referring to segment 27, this segment is in the circuit including solenoid 19 which actuates the valve 18 controlling the flow of steam to the heating coils 16. Said segment terminates at its upper end in a position corresponding to 70° dry bulb temperature in chamber 1. Consequently if the dry bulb temperature within said chamber rises above 70° the circuit is opened by switch arm 33 and valve 18 closes and automatically cuts off the supply of heating steam.

The control of the supply of moistening steam from the pipe 20 must be regulated in accordance with the variations in the relative humidity within the chamber 1. The relative humidity of air is determined by empirical tables from the readings of the dry bulb and wet bulb thermometers. Assuming the dry bulb temperature to be maintained at 70°, as in the instance under consideration, calculation shows that the corresponding wet bulb temperature will vary between 54½° and 56 degrees with variation in barometric pressure between 23 and 30 inches. Therefore, in the present instrument, segment 28 is short and stands at practically 70°, while segment 29 is of such length and is so located as to correspond to variation in the wet bulb reading of from 54½° to 56°. As a result, whenever the dry bulb temperature is 70° (omitting consideration of normal variations in barometric pressure) the circuit through the solenoid 22 controlling the steam supply will be closed. If the dry bulb temperature rises materially above or drops materially below 70°, or if the wet bulb temperature rises above 56° or falls below 54½° the circuit through the solenoid 22 is opened and the supply of moistening steam is turned off. Obviously, if it is desired to maintain any definite percentage of relative humidity within chamber 1 it is only necessary to properly locate segment 28 and segment 29 and calibrate the circumferential extents or values thereof according to calculations from the usual empirical tables.

The effect of the entire instrument is, first, to turn on the supply of cooling or condensing liquid whenever the temperature of the outside air rises above 43°, the effect of this cooling or condensing liquid being to condense practically all of the moisture originally contained in the air so as to reduce the moisture therein to a small or negligible quantity and, second, to thereafter heat the air to the temperature which it is desired to maintain and to automatically supply to it just sufficient moisture to maintain the relative humidity at the desired percentage

What I claim is:

1. Air conditioning apparatus, comprising means for supplying an air current to a chamber, means for adjusting the moisture content of said air current to limit the same to less than the minimum quantity desired in said chamber, said adjusting means having associated therewith a controlling part sensitive to the air condition outside of said chamber, and means for supplying moisture to said air current in sufficient quantity to bring the total moisture content up to the desired minimum quantity.

2. Air conditioning apparatus, comprising means for supplying an air current to a chamber, means for adjusting the moisture content of said air current to limit the same to less than the minimum quantity desired in said chamber, said adjusting means having associated therewith a controlling part responsive to the temperature of the air outside of said chamber, and means for supplying moisture to said air current in sufficient quantity to bring the total moisture content up to the desired minimum quantity.

3. Air conditioning apparatus, comprising means for supplying an air current to a chamber, means for adjusting the moisture content of said air current to limit the same to less than the minimum quantity desired in said chamber, said adjusting means having associated therewith a controlling part responsive to the condition of the air outside of said chamber, and means for maintaining a definite relative humidity in said chamber, said maintaining means having associated therewith a controlling part sensitive to the humidity of the air in said chamber.

4. Apparatus for conditioning moisture laden air, comprising means for supplying an air current to a chamber through a single air passage, condensing means for reducing the moisture content of said air current in said passage, means for heating the air current in said passage, control means sensitive to an air condition outside of said chamber for effecting the operation and the non-operation of said condensing means, and control means for effecting the operation and the non-operation of said heating means.

5. Apparatus for conditioning moisture laden air, comprising means for supplying an air current to a chamber through a single air passage condensing means for reducing the moisture content of said air current in said passage, means for heating the air current in said passage, control means sensitive to an air condition outside of said chamber for effecting the operation and the non-operation of said condensing means, and control means sensitive to an air condition within said chamber for effecting the operation and the non-operation of said heating means.

6. Apparatus for conditioning moisture laden air, comprising means for supplying an air current to a chamber through a single air passage, condensing means for reducing the moisture content of said air current in said passage to less than the desired quantity, means for heating said air current in said passage, means for supplying moisture to the air current in said passage, and control means sensitive to the condition of the air both outside of said chamber and passage and inside of said chamber for effecting the operation and the non-operation of said condensing means, said heating means and said moisture supplying means.

7. Apparatus for conditioning moisture laden air, comprising means for supplying an air current to a chamber, condensing means for reducing the moisture content of said air current, means for heating the air current in said passage, and separate control means for effecting the operation and the non-operation of said condensing means and said heating means, at least one of said control means being sensitive to the air condition outside of said chamber.

8. Apparatus for conditioning moisture laden air, comprising means for supplying an air current to a chamber, condensing means for reducing the moisture content of said current to less than the desired quantity, means for heating said air current, means for supplying moisture to said air current, and separate control means for said condensing means, said heating means and said moisture supplying means, at least one of said control means being sensitive to the air condition outside of said chamber.

9. Apparatus for conditioning moisture laden air, comprising means for supplying an air current to a chamber, condensing means for reducing the moisture content of said air current to less than the desired quantity, means for heating said air current, means for supplying moisture to said air current, and separate control means for said condensing means, said heating means and said moisture supplying means, one of said control means being sensitive to the air condition outside of said chamber and another of said control means being sensitive to the air conditions within said chamber.

10. Apparatus for conditioning moisture laden air, comprising means for supplying an air current to a chamber, condensing means for reducing the moisture content of said air current to less than the desired quantity, means for heating said air current, means for supplying moisture to said current, separate control means for said condensing means, said heating means and said moisture supplying means, the control means for said condensing means being responsive to the air condition outside of said chamber and the other control means being responsive to the air condition within said chamber.

In testimony whereof I hereby affix my signature.

EMIL J. CARROLL.